US 7,669,555 B2

(12) United States Patent
Emery

(10) Patent No.: US 7,669,555 B2
(45) Date of Patent: Mar. 2, 2010

(54) SELF-CLEANING PET LITTER BOX ASSEMBLY WITH RECIPROCATING BARS

(76) Inventor: Richard H. Emery, 800 Hart Rd., Lebanon, OH (US) 45036

( * ) Notice: Subject to any disclaimer, the term of this patent is extended or adjusted under 35 U.S.C. 154(b) by 0 days.

(21) Appl. No.: 11/828,413

(22) Filed: Jul. 26, 2007

(65) Prior Publication Data

US 2008/0017122 A1    Jan. 24, 2008

Related U.S. Application Data

(62) Division of application No. 11/012,565, filed on Dec. 15, 2004, now Pat. No. 7,290,499.

(60) Provisional application No. 60/543,101, filed on Feb. 9, 2004.

(51) Int. Cl.
*A01K 29/00* (2006.01)
(52) U.S. Cl. ..................................... 119/166
(58) Field of Classification Search ............. 119/161, 119/163, 164, 165, 166, 168; 198/750.1, 198/750.2, 409, 429, 468.1, 517, 614, 750.14, 198/750.11, 621.1, 736; 209/329, 674, 677, 209/678, 660
See application file for complete search history.

(56) References Cited

U.S. PATENT DOCUMENTS

| 666,865 | A |   | 1/1901 | Helfensteller, Jr. |
| 817,289 | A | * | 4/1906 | Whitney ............... 460/85 |
| 1,773,576 | A | * | 8/1930 | Downes ............... 210/154 |
| 3,412,859 | A | * | 11/1968 | Thornton ............. 209/329 |
| 3,971,716 | A |   | 7/1976 | Foreman |
| 4,018,009 | A |   | 4/1977 | Leliaert |
| 4,096,827 | A |   | 6/1978 | Cotter |
| 4,295,300 | A |   | 10/1981 | Walther et al. |
| 4,574,735 | A |   | 3/1986 | Hohenstein |
| 4,660,726 | A |   | 4/1987 | Woode |
| 4,817,560 | A |   | 4/1989 | Prince et al. |
| 4,846,104 | A |   | 7/1989 | Pierson, Jr. |

(Continued)

FOREIGN PATENT DOCUMENTS

BE          625569         11/1962

(Continued)

OTHER PUBLICATIONS

European Patent Office, International Search Report, date of mailing May 20, 2005.

(Continued)

*Primary Examiner*—Kimberly S Smith
*Assistant Examiner*—Joshua J Michener
(74) *Attorney, Agent, or Firm*—Wood, Herron & Evans, LLP

(57) ABSTRACT

A self-cleaning pet litter box has a conveyor to incrementally transport clumped litter material and solid pet waste to a waste receptacle. The conveyor has one end configured to extend into a pet litter container of the self-cleaning litter box and an opposite exit end. The conveyor is configured for reciprocating movement to lift the clumped litter material and solid pet waste from below, transport it some distance along the conveyor, place the material down again, return to its original position, and repeat the motion again to incrementally move the material along the conveyor toward the exit end for subsequent disposal.

17 Claims, 6 Drawing Sheets

U.S. PATENT DOCUMENTS

| | | | |
|---|---|---|---|
| 4,853,116 A | | 8/1989 | Wallander |
| 5,032,262 A | * | 7/1991 | Wallander .................. 210/154 |
| 5,048,464 A | | 9/1991 | Shirley |
| 5,048,465 A | | 9/1991 | Carlisi |
| 5,107,797 A | | 4/1992 | LaRoche |
| 5,188,062 A | | 2/1993 | Joy et al. |
| 5,279,258 A | | 1/1994 | Kakuta |
| 5,289,799 A | | 3/1994 | Wilson |
| 5,456,826 A | * | 10/1995 | Mellegard .................. 210/155 |
| 5,460,122 A | | 10/1995 | Reinartz |
| 5,477,812 A | | 12/1995 | Waters |
| 5,613,595 A | | 3/1997 | Ukada |
| 5,662,066 A | | 9/1997 | Reitz |
| 5,749,318 A | | 5/1998 | Barbot et al. |
| 5,931,119 A | | 8/1999 | Nissim et al. |
| 6,205,954 B1 | | 3/2001 | Bogaerts |
| 6,234,112 B1 | | 5/2001 | Emery |
| 6,401,661 B1 | | 6/2002 | Emery |
| 6,401,937 B1 | | 6/2002 | Schmidt |
| 6,568,348 B1 | | 5/2003 | Bedard |
| 6,761,261 B2 | | 7/2004 | Dussault et al. |
| 6,763,782 B1 | | 7/2004 | Kordelin |
| 6,827,035 B2 | | 12/2004 | Manera |
| 2002/0139312 A1 | | 10/2002 | Reitz |
| 2005/0172909 A1 | | 8/2005 | Emery |

FOREIGN PATENT DOCUMENTS

| | | |
|---|---|---|
| DE | 2652511 | 5/1978 |
| FR | 1054082 | 2/1954 |

OTHER PUBLICATIONS

European Patent Office, Written Opinion of the International Searching Authority, date of mailing May 20, 2005.

* cited by examiner

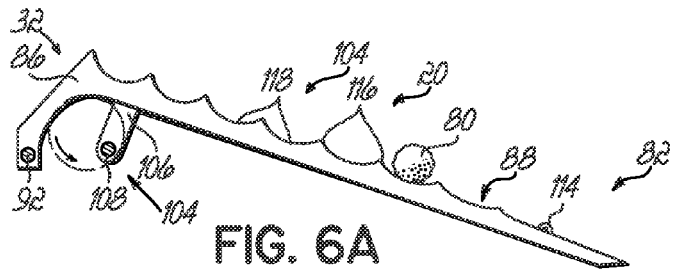
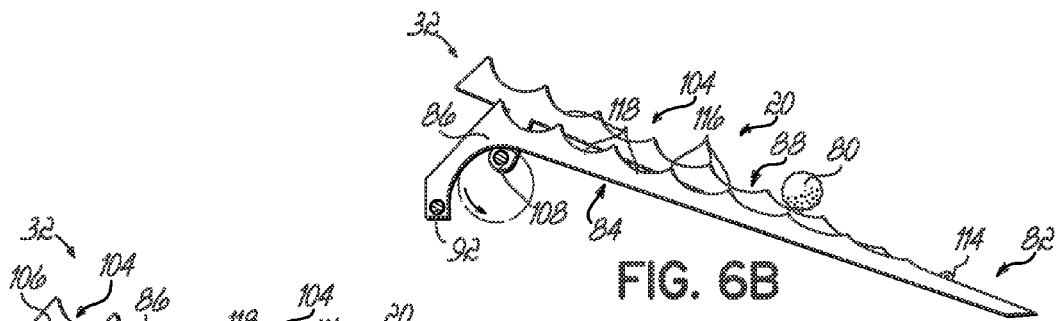
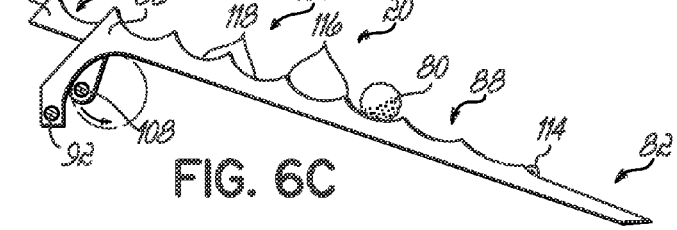
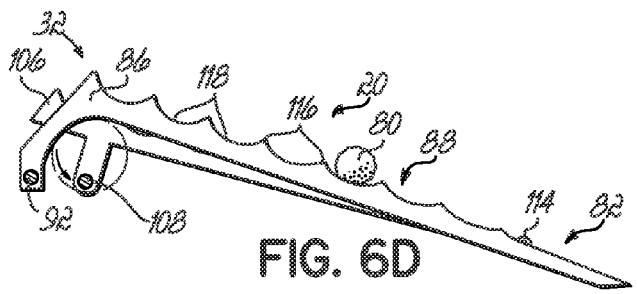
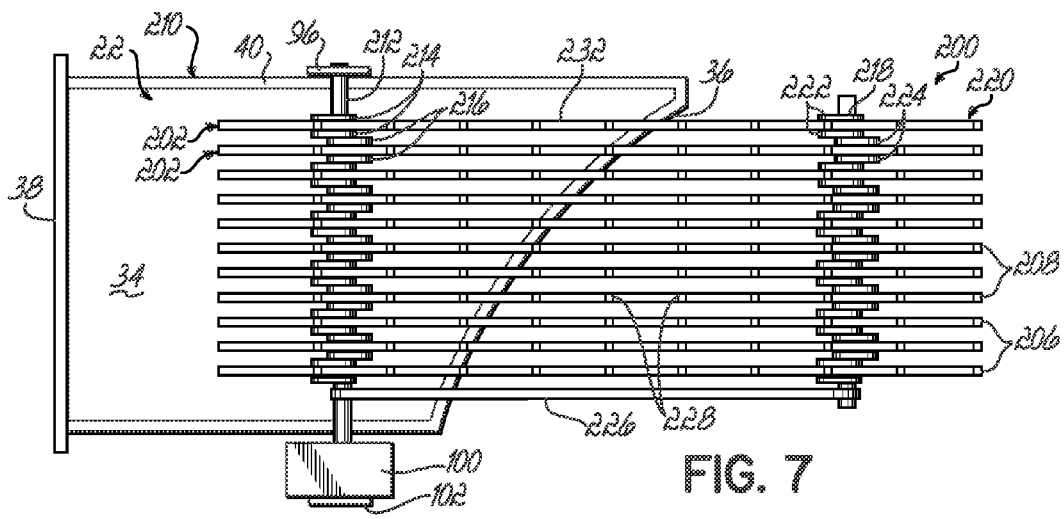

SELF-CLEANING PET LITTER BOX ASSEMBLY WITH RECIPROCATING BARS

The present application is a divisional application of co-pending U.S. Ser. No. 11/012,565, filed Dec. 15, 2004, which claims the filing benefit of U.S. Provisional Application Ser. No. 60/543,101, filed Feb. 9, 2004, the disclosures of which are incorporated herein by reference in their entirety.

FIELD OF THE INVENTION

The present invention relates generally to pet litter boxes and, more particularly, to a self-cleaning pet litter box that conveys or transports clumped litter material and solid pet waste away from clean litter contained within the pet litter box.

BACKGROUND OF THE INVENTION

A large number of households have one or more animal pets. Domestic cats in particular are estimated to live in over thirty million homes all or most of the day. A litter box or the like is a necessity for such homes. In fact, basic litter boxes which are rectangular-shaped with a height of about four to five inches have been used for many years. While much development work has been expended in producing improved litter material to make it more absorbent, odor-free, dust-free, etc., very little change has occurred in the basic litter box itself. Those boxes being presently commercialized are remarkably similar to those of several years ago.

Maintaining pet litter boxes requires frequent cleaning and attention. This job is unpleasant due to odor. Strong odor and unsanitary conditions develop quickly if the pet litter box is not properly maintained on a frequent basis. Busy schedules and travel make proper attention to the pet litter boxes difficult.

Conventional litter boxes are popular simply because they have proven themselves effective. Cats are readily trained to use them. The biggest drawback associated with the conventional litter box is a need to periodically remove soiled litter material and replenish it with new litter material. Any cat owner will attest to the fact cats are fastidious. They will not use a litter box which contains what they consider an excessive amount of soiled litter material. The cat owner can at that point simply dump the full contents of the litter box into the trash or otherwise dispose of it. This, of course, is wasteful and expensive in that a substantial amount of unsoiled litter material is being disposed of along with the soiled litter material. It is more common for the cat owner to try to segregate soiled from unsoiled litter material. This is possible because most litter materials are designed to clump when wetted. Various scoops are sold for this purpose. However, the task of scooping clumped soiled litter material and cat feces from a litter box is still an arduous and unpleasant task.

The problem with cleaning and keeping the contents of a litter box in a state which is acceptable to the cat is well recognized. Several attempts have been made over the years to remedy the problem. U.S. Pat. Nos. 4,846,104, 5,048,464, and 5,662,066 contain disclosures of self-cleaning pet litter box systems wherein specially configured spherical or cylindrical containers rotate in a manner to separate clumped from unclumped litter material. U.S. Pat. Nos. 4,574,735, 5,048, 465 and 5,477,812 also disclose self-cleaning pet litter box systems. Basically, the systems have a stationary litter container and a rake or comb-type device that periodically moves through litter in the container to separate out clumped material. The clumped material is directed to a separate disposal system as part of the process.

Applicant has developed a self-cleaning pet litter box assembly which overcomes known problems and disadvantages of prior self-cleaning pet litter box systems as fully described in Applicant's U.S. Pat. Nos. 6,234,112 and 6,401, 661, which disclosures are hereby incorporated herein by reference. The self-cleaning pet litter box assembly described in these patents is motor driven to rotate and during the rotation segregate clumped material and solid pet waste from unclumped litter material. The assembly comprises a base member with a pet litter container mounted thereon for horizontal rotational movement. A motor is mounted on the base member or other locations and is operatively connected to the litter container to slowly and continuously rotate the container. However, the litter container could also be rotated periodically, or at various rates of speed. The assembly also includes a separating member and a conveyor. The separating member extends into the litter within the litter container. As the litter container rotates, clumped and unclumped litter material and solid pet waste move into contact with the separating member. Unclumped litter passes through the separating member and remains in the litter container for reuse. Soiled clumped litter and solid pet waste is directed toward the conveyor by the separating member where they are conveyed away to a waste receptacle. The pet owner periodically must empty or replace the waste receptacle, however, the task is less often and not as unpleasant as before.

While Applicant's self-cleaning pet litter box assembly as described in U.S. Pat. Nos. 6,234,112 and 6,401,661 overcomes the known drawbacks and disadvantages of prior self-cleaning pet litter box systems, there is an on going need for improvements in self-cleaning pet litter box assemblies to effectively separate and remove pet waste and soiled pet litter from unclumped litter material in the pet litter container.

SUMMARY OF THE INVENTION

The present invention overcomes the foregoing and other shortcomings and drawbacks of self-cleaning pet litter box assemblies heretofore known. While the invention will be described in connection with certain embodiments, it will be understood that the invention is not limited to these embodiments. On the contrary, the invention includes all alternatives, modifications and equivalents as may be included within the spirit and scope of the present invention.

According to the principles of the present invention, a self-cleaning pet litter box assembly is provided which is configured to separate and remove clumped litter material and solid pet waste from clean litter within a pet litter container. In one embodiment of the present invention, the self-cleaning litter box assembly includes a base and an open-top pet litter container which is configured to hold pet litter therein. The pet litter container is mounted for substantially horizontal rotation relative to the base. A motor is operatively connected to the pet litter container to rotate the pet litter container relative to the base. The rotation of the pet litter container can be continuous or, alternatively, the rotation can be intermittent.

The self-cleaning pet litter box assembly of the present invention also includes a conveyor having one end configured to extend into the pet litter container and an opposite exit end. The conveyor is operable to separate out the clumped litter material and solid pet waste from the clean litter and incrementally transport it away from the litter within the pet litter container and toward the exit end of the conveyor. The clumped litter material and solid pet waste is advanced with the clean litter toward the conveyor during horizontal rotation of the pet litter container. The conveyor can extend to near the bottom of the pet litter container or stop at a higher elevation either below, generally at, or above the level of the litter within the container.

In accordance with the principles of the present invention, the conveyor uses a reciprocating motion for transporting the clumped litter material and solid pet waste toward the exit end of the conveyor. The reciprocating motion of conveyor is used to lift the clumped litter material or solid pet waste, transport it some distance along the conveyor, place the material down again, return to its original position by passing below the clumped litter material or solid pet waste, and repeat the motion again to incrementally move the material along the conveyor in substantially discrete increments for subsequent disposal, such as in a waste receptacle positioned adjacent the exit end of the conveyor. The reciprocating motion of the conveyor gently lifts the material from below, where the clump should have a coating of clean dry litter. This minimizes the amount of breaking of the clumps and minimizes the amount of sticky material that will adhere to the reciprocating conveyor. In addition, the conveyor is self-cleaning.

An optional separating member, such as a sieve, grate, comb, rake or other suitable structure, is positioned on opposite sides of the conveyor to contact the litter within the pet litter container. As the pet litter container rotates, clumped and unclumped litter material and solid pet waste move into contact with the separating member. Unclumped litter passes through the separating member and remains in the litter container for reuse. Soiled clumped litter and solid pet waste are directed by the separating member toward the conveyor which incrementally transports the segregated material toward the waste receptacle.

The self-cleaning pet litter box assembly of the present invention also includes an optional cover for the open-top pet litter container. The cover makes the self-cleaning pet litter box assembly more aesthetically pleasing and also helps to protect moving components of the assembly. The cover is dimensioned to be positioned over the base and fully cover the upper rim of the pet litter container and various moving parts of the self-cleaning pet litter box assembly. The cover is configured to effectively raise the height of the pet litter container to minimize litter from being scattered during use of the litter box assembly by a cat and also minimize the possibility of litter escaping between the pet litter container and the cover.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIGS. 6A-6D are diagrammatic side elevational views showing operation of the conveyor of FIG. 3;

FIG. 7 is a top plan view of a conveyor according to a second embodiment of the present invention;

DETAILED DESCRIPTION OF THE INVENTION

Figure 1:
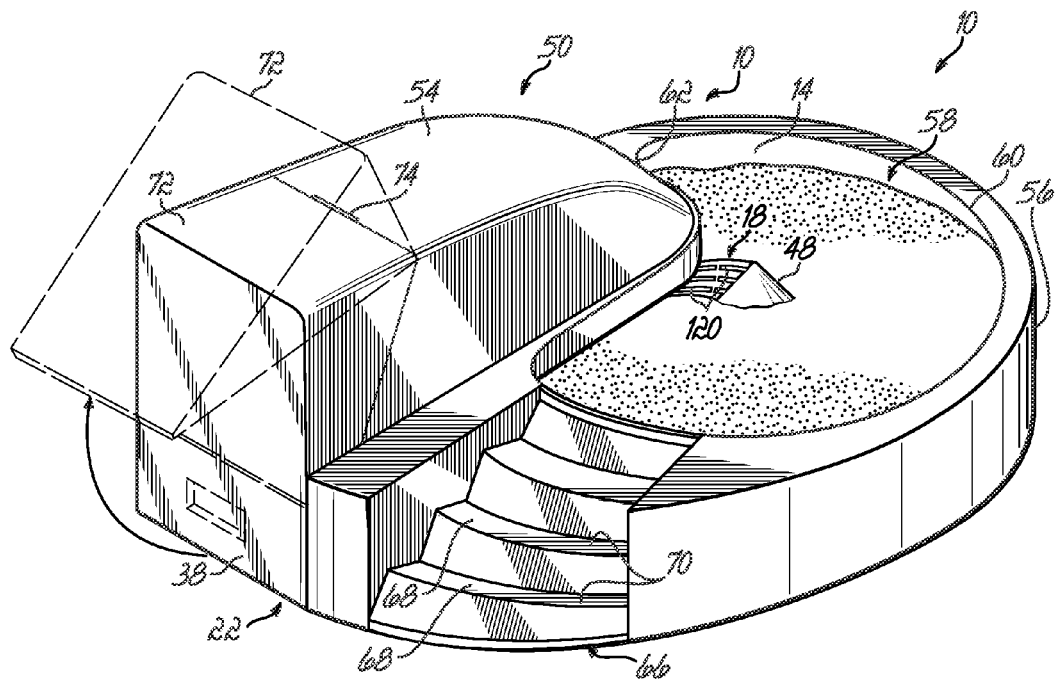
FIG. 1 is a perspective view of a self-cleaning pet litter box assembly according to one embodiment of the present invention.

The self-cleaning pet litter box assembly of the present invention and its method of use are described in detail in the following paragraphs and with reference to the drawings. The self-cleaning pet litter box assembly is described herein with reference to use by cats. While other domestic animals can be trained to use the pet litter box and such other uses are contemplated, the need for the self-cleaning pet litter box by cat owners is greatest and for this reason the description which follows is directed to cat usage.

As used throughout this specification, clumped litter material is used to refer to soiled pet litter which has clustered to form a clump as well as solid pet waste. Unclumped litter material includes fresh pet litter and substantially clean free-flowing pet litter which is reusable.

With reference to the figures, and to FIGS. 1-5 in particular, a self-cleaning pet litter box assembly 10 is shown according to one embodiment of the present invention. The assembly 10 includes a base member 12, an open-top pet litter container 14, a drive mechanism such as a motor 16 for rotating the litter container 14 relative to the base member 12, a separating member 18, a conveyor 20, and a waste receptacle 22. The aforementioned components are operatively connected so that the pet litter container 14 continuously or intermittently rotates and any clumped litter material and solid pet waste in the litter container 14 are segregated from unclumped litter material and incrementally transported away by the conveyor 20 for disposal into the waste receptacle 22.

While a self-cleaning pet litter box 10 is described and illustrated herein having a rotating pet litter container 14 and a stationary conveyor 20; it will be understood that the present invention contemplates, alternatively, a stationary pet litter container having a conveyor which is rotatable relative to the stationary pet litter container as well. Accordingly, the present invention contemplates any self-cleaning pet litter box having a pet litter container and a conveyor which are rotatable relative to each other to separate clumped litter material and soiled pet waste from clean litter material and incrementally transport the segregated material to a waste receptacle.

In one embodiment, the base member 12 is configured to support the pet litter container 14, the motor 16, the waste receptacle 22 and the conveyor 20. The pet litter container 14 is supported on the base member 12 in a manner whereby it can rotate generally about the pet litter container's center vertical axis, i.e., the pet litter container 14 is mounted for horizontal rotation relative to the base member 12. In one embodiment, the motor 16 is mounted on the base member 12 and is operatively connected to the pet litter container 14 to cause its rotation, although other locations of the motor 16 are possible as well. The rotation of the pet litter container 14 can be continuous or, alternatively, the rotation can be intermittent.

Figure 4:
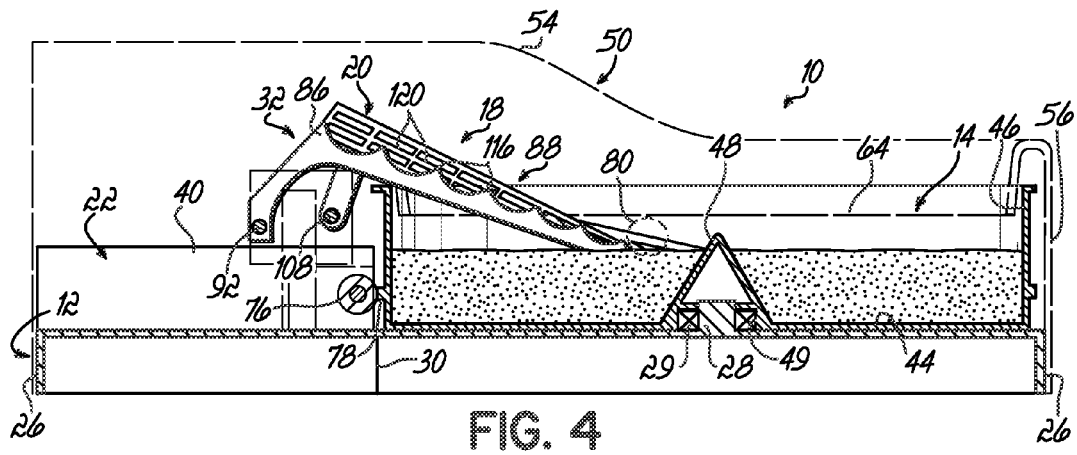
FIG. 4 is a cross-section view of the self-cleaning pet litter box assembly of FIG. 2 taken along line 4-4 of FIG. 2.
Figure 5:
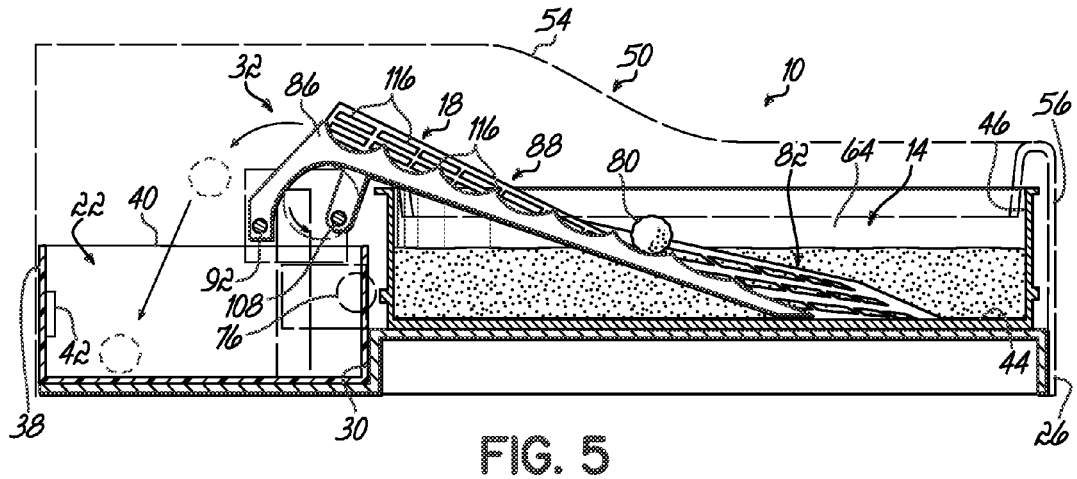
FIG. 5 is a cross-section view of the self-cleaning pet litter box assembly of FIG. 2 taken along line 4-4 of FIG. 2.
Figure 8A:
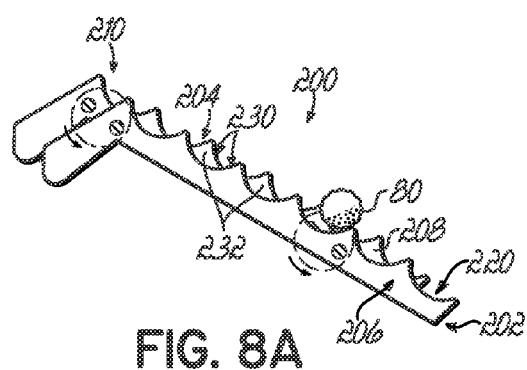
FIGS. 8A-8D are diagrammatic side elevational views showing operation of the conveyor of FIG. 7.
Figure 8B:
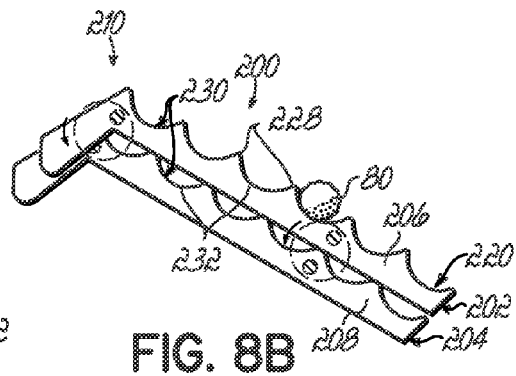
Figure 8C:
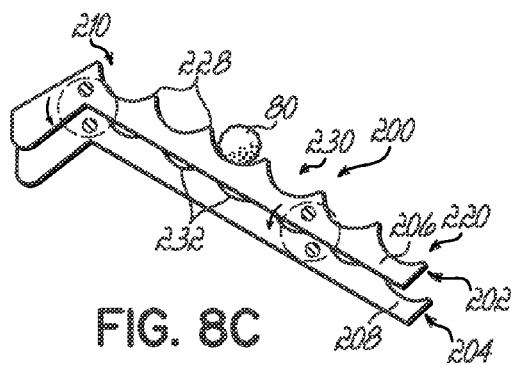
Figure 8D:
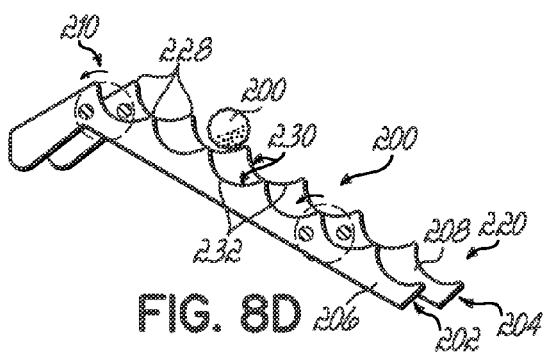

As shown in FIGS. 4 and 5, the base member 12 may have a generally flat wall portion 24 which is supported above a floor or other support surface (not shown) through a skirt wall 26 which depends from the flat wall portion 24. Alternatively, the wall portion 24 could be radiused or have some other contour. The base member 12 is provided with means for mounting the pet litter container 14 in a manner so it is registered with the base member 12 and free to horizontally rotate thereupon. In one embodiment as shown in FIG. 4, the base member 12 has an upstanding boss 28 and a bearing 29 which cooperate with the open-top pet litter container 14 as described in detail below.

A recess 30 (FIG. 5) is formed in the base member 12 to accommodate the waste receptacle 22. In one embodiment, the waste receptacle 22 comprises an open-top pull-out drawer which is slidably supported on the base member 12 adjacent an exit end 32 of the conveyor 20. In one embodiment, the waste receptacle 22 has a bottom wall 34, a curved upstanding front wall 36, an upstanding rear wall 38 and a pair of upstanding side walls 40 which extend between the front and rear walls 36 and 38. A recessed notch 42 (FIGS. 1, 2 and 5) is formed in the upstanding rear wall 38 of the waste receptacle 22 which is sized to receive a pet owner's fingers so that the waste receptacle 22 may be easily removed from and inserted within the recess 30 of the base member 12. Of course, other grasping structures such as a knob or handle are possible as well.

The waste receptacle 22 is sized to hold sufficient clumped litter material and solid pet waste so that the pet owner need only empty or replace the waste receptacle on occasion, for example once per week. Needless to say, the greater the capacity of the waste receptacle 22, the less often the pet owner must empty or replace the receptacle. The waste receptacle 22 may include a liner (not shown), such as a thermoformed liner or a flexible bag (not shown), positioned within the receptacle 22 to facilitate removal and disposal of the clumped material and solid pet waste. In this way, the waste receptacle 22 is kept generally clean and the liner (not shown) and its contents are easily disposed of with minimal contact by the pet owner. Alternatively, the waste receptacle 22 itself can be made disposable so that the waste receptacle is replaced each time the pet litter box assembly 10 is cleaned.

As shown in FIGS. 1, 2, 4 and 5, the open-top litter container 14 is generally circular and is dimensioned to fit onto the base member 12. Preferably, the container 14 is small enough to be hand carried and not occupy excessive space or become conspicuous by its size alone. Preferred for ease of use and manufacturing reasons is a circular-shaped open-top container which has a diameter of about fourteen inches to about thirty-six inches and a depth of about three inches to about six inches. As shown in FIGS. 4 and 5, the pet litter container 14 has a generally flat bottom wall 44 and an upstanding circular sidewall 46. Preferably, the litter container 14 has a diameter of from about fourteen inches to about twenty-four inches and a sidewall height from about three inches to about five inches. Such a dimensioned pet litter container holds sufficient pet litter for the purpose intended.

Figure 2:
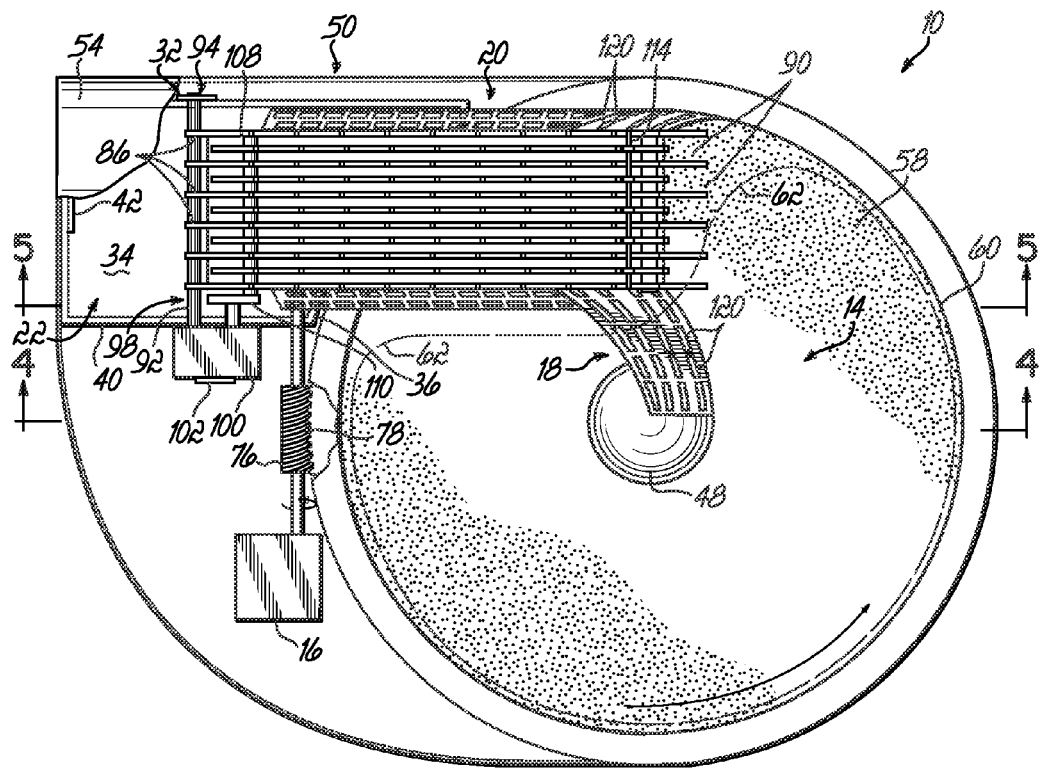
FIG. 2 is a top plan view of the self-cleaning pet litter box assembly shown in FIG. 1.
Figure 3:
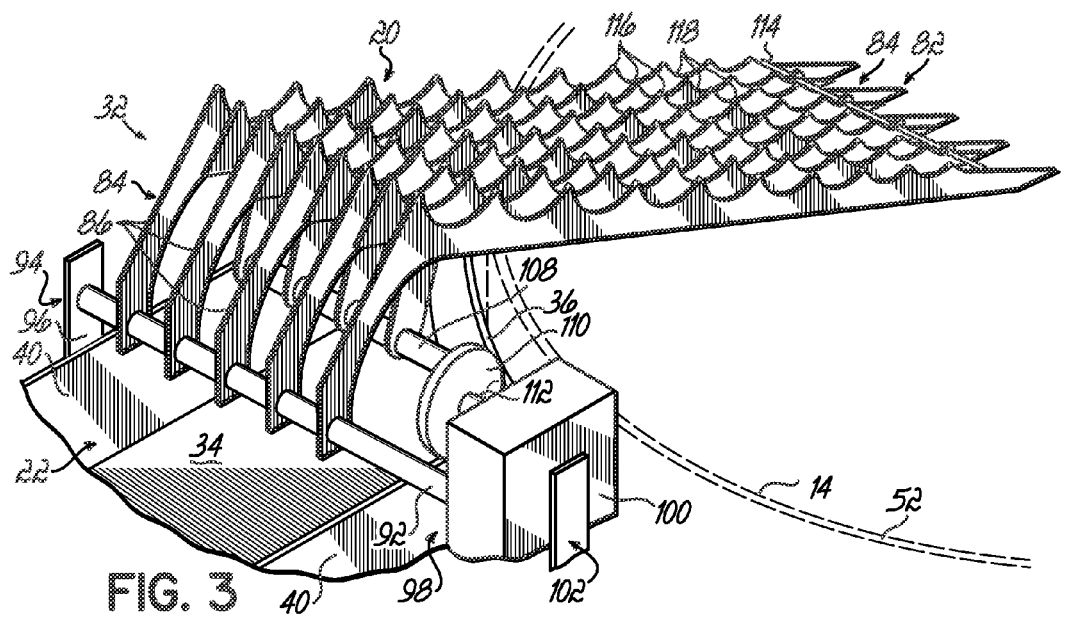
FIG. 3 is a perspective view of a conveyor according to one embodiment of the present invention for use in the self-cleaning pet litter box assembly of FIG. 1.

Further referring to FIGS. 1, 2 and 4, the open-top pet litter container 14 has an optional central cone 48 extending upwardly from the bottom wall 44. As shown in FIG. 4, the cone 48 has a recess 49 formed therein near the bottom wall 44 of the pet litter container 14. The recess 49 is dimensioned to overlie the boss 28 and bearing 29 of the base member 12. In this manner, the pet litter container 14 is mounted on the base member 12 and is free to horizontally rotate relative to the base member 12. While not shown, it will be appreciated that bearings (not shown) may be provided between the bottom wall 44 of the pet litter container 14 and the flat wall portion 24 of the base member 12 to further facilitate its smooth horizontal rotation on the base member 12. Those of ordinary skill in the art will appreciated that other base member and pet litter container configurations are possible as well without departing from the spirit and scope of the present invention.

An optional cover 50 for the open-top pet litter container 14 is shown in FIGS. 1, 2, 4 and 5. The cover 50 makes the self-cleaning pet litter box assembly 10 more aesthetically pleasing and also helps to protect moving components of the assembly. The cover 50 is dimensioned to be positioned over the base member 12 and fully cover the upper rim 52 of the pet litter container 14 and various moving parts of the self-cleaning pet litter box assembly 10.

In one embodiment, the cover 50 has a domed portion 54 which is positioned to cover the conveyor 20 and the waste receptacle 22 and a skirt wall 56 which extends fully around the base member 12 and down to the floor (not shown). An opening 58 is provided in the cover 50 which is sized sufficiently to accommodate a cat within the pet litter container 14. As shown in FIGS. 1 and 2, the opening 58 has a curved edge 60 which follows the upper rim 52 of the pet litter container 14 and smoothly curved edges 62 which extend from the curved edge 60 toward the center of the pet litter container 14. Of course, other shaped openings are possible as well. Preferably, the opening 58 is sized to expose from about 25% to about 75% of the top surface area of the pet litter container 14.

As shown in FIGS. 4 and 5, the skirt wall 56 of the cover 50 rises above the upper rim 52 of the pet litter container 14 and has a downwardly turned lip 64 which extends into the container 14 and below its rim 52. The skirt wall 56 effectively raises the height of the pet litter container 14 to minimize litter from being scattered during use of the litter box assembly 10 by a cat. The downwardly turned lip 64 of the cover 50 minimizes the possibility of litter escaping between the pet litter container 14 and the cover 50.

In one embodiment as shown in FIG. 1, the cover 50 includes a series of steps which extend from the floor (not shown) to the open top of the pet litter container 14 to facilitate entry and exit of the cat. Preferably, the upper surfaces 68 of the steps 66 are angled slightly downwardly to form pockets 70 so that any loose litter from the cat's paws is retained in the pockets 70 as the loose litter slides down the downwardly angled upper surfaces 68 of the steps 66 toward the pockets 70. This configuration of the steps 66 helps to keep the area around the pet litter box assembly 10 free of loose litter. Of course, other entry and exit structures such as an inclined ramp are possible as well.

In one embodiment as shown in FIG. 1, the cover 50 includes a door 72 which is hinged to the dome portion 54 of the cover 50 through a hinge 74. In its lowered position, the door 72 and dome portion 54 fully cover the waste receptacle 22 and conveyor 20 so that the waste receptacle and conveyor are hidden from view and odor from the clumped material and solid pet waste contained within the waste receptacle is minimized. The door 72 can be pivoted upwardly as shown in phantom in FIG. 1 to provide the pet owner with access to the waste receptacle 22 when it needs to be emptied or replaced.

As shown in FIGS. 2 and 4, the motor 16 is supported on the base member 12 to rotate the open-top pet litter container 14. In one embodiment, the motor 16 is an electric motor with an electric cord (not shown) for plugging into a conventional wall outlet (with or without a transformer). Alternatively, the electric motor 16 can be battery powered.

In one embodiment, a worm gear 76 is connected to the drive shaft of the motor 16 in a known manner. Worm gear teeth 78 which extend around the sidewall 46 of the container 14 are operatively connected to the worm gear 76. The motor 16 drives the worm gear 76 which causes the pet litter container 14 to rotate. Alternatively, the pet litter container 14 could be driven by a motor and belt system as shown in U.S. Pat. Nos. 6,234,112 and 6,401,661 or any other drive system known to those of ordinary skill in the art which is capable of imparting horizontal rotation movement to the pet litter container 14.

While a motor 16 is described for imparting horizontal rotational movement to the pet litter container 14, it is contemplated that the pet litter container 14 could also be driven manually by occasionally turning a hand crank (not shown) or operated with a winding device (not shown) or any other manual or semi-manual device known to those skilled in the art which is capable of imparting horizontal rotational movement to the pet litter box container 14.

The rotation of the pet litter container 14 can be continuous or, alternatively, the rotation can be intermittent. That is, at set intervals determined by a timer (not shown), the pet litter container 14 can be caused to rotate a full revolution, e.g., one full rotation per hour. A motion sensor or other type of sensor (not shown) can also be used to sense when the cat has used the self-cleaning pet litter box 10 and, in response, cause the pet litter container 14 to rotate approximately at least one full revolution to separate out and convey away the clumped litter material and solid pet waste as described in greater detail below.

Alternatively, the motor 16 can be geared to cause a slow continuous rotation of the pet litter container 14. It is contemplated that a rate of rotation of less than about forty-eight revolutions per day, preferably from about one revolution per day to about thirty-six revolutions per day is sufficiently slow that a cat using the assembly 10 of the present invention does not detect, or at least is not disturbed by, the litter container's motion.

The self-cleaning pet litter box assembly 10 of the present invention also includes the conveyor 20 to separate out the clumped litter material and solid pet waste, shown diagrammatically as numeral 80, from the clean litter and incrementally transport it away to the waste receptacle 22. It will be appreciated that the clumped litter material and solid pet waste is advanced with the clean litter material toward the conveyor 20 during horizontal rotation of the pet litter container 14. The conveyor 20 has a lower end 82 configured to extend into the pet litter container 14 and the opposite exit end 32. The conveyor 20 can extend to near the bottom of the pet litter container 14 or stop at a higher elevation either below, generally at, or above the level of the litter within the container 14.

In one embodiment, the conveyor 20 uses a reciprocating motion for transporting the soiled pet litter and solid pet waste 80 from the pet litter container 14 to the waste receptacle 22. The present invention contemplates any conveyor system which is operable, through a reciprocating motion, to lift clumped litter material or solid pet waste from below and transport it incrementally, i.e., in substantially discrete increments, on the conveyor 20 away from litter within the pet litter container 14 and toward the exit end 32. The reciprocating motion of conveyor 20 can be orbital, linear or any other compound motion such that the conveyor 20 is operable to lift the clumped litter material or solid pet waste 80 from below, transport it some distance along the conveyor 20, place the material down again, return to its original position, and repeat the motion again to incrementally move the material along the conveyor 20 for subsequent disposal in the waste receptacle 22 as shown in FIGS. 1-5, 6A-6D, 8A-8D and 11A-11D. The clumped litter material or solid pet waste 80 is moved incrementally in response to reciprocating motions of the conveyor 20 for moving the material to the desired location. This reciprocating motion can be used to incrementally move the clumps of soiled litter or solid pet waste horizontally or diagonally up an incline.

In one embodiment, as shown in FIGS. 2-5, the conveyor 20 is inclined and extends from the lower end 82 positioned within the pet litter container 14 near the bottom of the container to the exit end 32 which is positioned adjacent the waste receptacle 22. The conveyor 20 has a stationary conveyor portion 84 comprising a series of generally parallel members 86, such as grates or other suitable structure, which define an inclined surface 88 for supporting the clumped litter or solid pet waste 80 as it is conveyed toward the waste receptacle 22. The stationary members 86 define slits, grooves or gaps 90 (FIG. 2) which allow unclumped litter material to fall therethrough and back to the pet litter container 14 for reuse.

In one embodiment, a transverse connecting member 92 is connected to each of the stationary members 86 adjacent the exit end 32 of the conveyor 20. One end 94 of the connecting member 92 is supported by an upstanding bracket 96 positioned on one side of the waste receptacle 22. The opposite end 98 of the connecting member 92 is supported by a housing of a motor 100 used to drive the conveyor 20 as will be described in detail below. The motor 100 is supported by an upstanding bracket 102 which is positioned on the opposite side of the waste receptacle 22. It will be appreciated by those of ordinary skill in the art that the conveyor 20 and motor 100 may be supported in other manners as well without departing from the spirit and scope of the present invention.

The conveyor 20 further includes a moving conveyor portion 104 comprising a series of generally parallel members 106, such as grates or other suitable structure, which are positioned between the stationary members 86 of the stationary conveyor portion 84. A transverse connecting member 108 is connected to each of the moving members 106 adjacent the exit end 32 of the conveyor 20. The moving conveyor portion 104 is operatively connected to the motor 100 adjacent the exit end 32 of the conveyor 20 through the connecting member 108 and a crank 110 driven by the motor 100. A drive shaft 112 of the motor 100 is connected to one side of the crank 110 generally at the axis of rotation of the crank 110. The connecting member 108 is connected to the opposite side of the crank 110 so that the connecting member 108 is offset from the axis of rotation of the crank 110.

As shown in FIGS. 2, 3 and 6A-6D, a transverse connecting member 114 is connected to the moving members 106 adjacent the lower end 82 of the conveyor 20. The connecting member 114 is supported on the stationary members 86 adjacent the lower end 82 of the conveyor 20 and is free to slide upwardly and downwardly on the inclined surface of the stationary members 86 during movement of the moving conveyor portion 104. It will be appreciated that other configurations for the lower end 82 of the conveyor 20 are possible as well without departing from the spirit and scope of the present invention.

As shown in FIGS. 6A-6D, the motor 100 rotates the crank 110 which causes the moving members 106 to rise up through the slits, grooves or gaps 90 (FIG. 2), lift clumps of soiled litter and solid pet waste 80 supported on the inclined surface 88 of the stationary conveyor portion 84, and carry them incrementally up the inclined surface 88. The motor 100 is energized to drive the conveyor 20 generally at the same time the motor 16 is energized to horizontally rotate the pet litter container 14. Any suitable power-driven linkage system known to those of ordinary skill in the art for imparting reciprocating motion to the moving conveyor portion 104 is contemplated by the present invention, including one or more cranks, cams or other suitable drive mechanisms. Also, while a pair of motors 16 and 100 are shown for independently rotating the pet litter box container 14 and driving the moving conveyor portion 104, it will be appreciated that a single motor could be provided to perform both functions.

Once the clumps of soiled pet litter and solid pet waste 80 have been moved one increment up the inclined surface 88 as shown in FIGS. 6A-6C, the moving conveyor portion 104 lowers through the slits, grooves or gaps 90 as shown in FIG. 6D, where it returns to its original position, ready to incrementally lift a new clump of litter or solid pet waste, and/or incrementally lift the previous material further up the inclined surface 88.

In one embodiment, the stationary and moving conveyor portions 84, 104 have a series of ridges, detents or other suitable structure 116 which are configured to help prevent the clumped litter and solid pet waste from falling down the inclined surface 88 during transport toward the exit end 32 of the conveyor 20. In one embodiment, each ridge or detent is spaced along the length of the conveyor 20 so that adjacent pairs of the detents define a series of pockets 118 therebetween as shown in FIGS. 3, 4, 5 and 6A-6D. The pockets 118 can be formed with a greater depth toward the exit end 32 of the conveyor 20 and a lesser depth toward the lower end 82.

In one embodiment, the conveyor 20 is configured to be removable from the base member 12 such as may be required to remove and clean the pet litter container 14. In this embodiment, the exit end 32 of the conveyor 20 and the motor 100 are supported by the pair of upstanding brackets 96, 102 which are freely supported on the base member 12. The pair of brackets 96, 102 may be fastened to the base member 12 through removable fasteners or other removable attachment devices such as screws or bolts (not shown).

There are several benefits to the use of reciprocating motion for moving or transporting clumps of soiled litter and solid wastes. The clumps are generally sticky and unstable (i.e., easily broken up). The moving conveyor portion 104 of the present invention gently lifts the material from below, where the clump should have a coating of clean dry litter. This minimizes the amount of breaking of the clumps and minimizes the amount of sticky material that will adhere to the conveyor 20.

In addition, the conveyor 20 is self-cleaning. This is due to the moving conveyor portion 104 passing through clean litter and/or the stationary conveyor portion 84 used to support the clumped litter and solid pet waste at times during the conveying process. When the moving conveyor portion 104 passes through the clean litter and/or stationary conveyor portion 84, it will effectively be stripped of any sticky material adhered thereto.

In one embodiment as shown in FIGS. 1, 2, 4 and 5, the optional separating member 18, such as a sieve, grate, comb, rake or other suitable structure, is positioned on opposite sides of the conveyor 20 to contact the litter within the pet litter container 14. As the pet litter container 14 rotates, clumped and unclumped litter material and solid pet waste move into contact with the separating member 18. Unclumped litter passes through the separating member 18 and remains in the litter container 14 for reuse. Soiled clumped litter and solid pet waste are directed by the separating member 18 toward the conveyor 20 which incrementally transports the segregated material toward the waste receptacle 22.

The separating member 18 may extend from one side of the conveyor 20 to near the sidewall 46 of the pet litter container 14 and, on the opposite side of the conveyor 20, extend to near the center mounting cone 48 of the pet litter container 14. The separating member 18 is positioned to extend approximately to the upper rim 52 of the pet litter container 14 and preferably terminates at or near the litter container's bottom wall 44. The separating member 18 has upwardly curved surfaces which are configured to separate clumped litter and solid pet waste from the clean litter within the pet litter container 14 and direct the waste toward the conveyor 20. A series of openings 120 are provided in the separating member 18 which are sized to retain clumped litter material and solid pet waste, but allow unclumped litter material to pass through the openings 120 as the pet litter container 14 rotates.

It will be appreciated that when the conveyor 20 is configured to extend to near the bottom wall 44 of the pet litter container 14, and the conveyor 20 has a width which extends substantially between the sidewall 46 of the pet litter container 14 and the center mounting cone 48, the separating member 18 may not be required. In this embodiment (not shown), the conveyor 20 functions not only to transport the waste toward the exit end 32 but also as a separating member since the unclumped litter is free to pass through the gaps formed between the stationary and moving conveyor portions 84 and 104, respectively, while the clumped litter material and solid pet waste is segregated from the clean litter material by the conveyor 20.

Referring now to FIG. 7, a conveyor 200 is shown in accordance with an alternative embodiment of the present invention, where like numerals represent like parts to the self-cleaning pet litter box assembly 10 of FIGS. 1-5 and 6A-6D. In this embodiment, the conveyor 200 comprises moving conveyor portions 202 and 204 which are each mounted for reciprocating movement to create a walking beam type conveyor. Each moving conveyor portion 202 and 204 has a series of generally parallel moving members 206 and 208, respectively, such as grates or other suitable structure, which provide a compound motion to "walk" the clumped litter or solid pet waste 80 up toward the exit end 210 of the conveyor 200 and into the waste receptacle 22 as shown in FIGS. 8A-8D.

A transverse cam shaft or crank shaft 212 is connected to each of the moving members 206 and 208 adjacent the exit end 210 of the conveyor 200 through alternating pairs of offset cams 214 and 216. The crank shaft 212 is connected to the drive motor 100 which imparts rotation to the crank shaft 212 to rotate the alternating pairs of offset cams 214 and 216. A transverse crank shaft 218 is connected to each of the moving members 206 and 208 adjacent a lower end 220 of the conveyor 200 through alternating pairs of offset cams 222 and 224. The crank shaft 218 is connected to the crank shaft 212 through a belt, chain or other suitable linkage device 226 so that rotational movement of the crank shaft 212 imparts rotational movement to the crank shaft 218. In this way, the rotation of the crank shaft 212 and 218 is synchronized to create the compound motion of the conveyor 200 to "walk" the clumped litter or solid pet waste 80 up toward the exit end 210 of the conveyor 200 and into the waste receptacle 22 during reciprocating movement of the moving conveyor portions 202 and 204 as shown in FIGS. 8A-8D.

Further referring to FIGS. 7 and 8A-8D, the moving conveyor portions 202, 204 have a series of ridges, detents or other suitable structure 228 configured to help prevent the clumped litter and solid pet waste from falling down the inclined surfaces 230 of each respective conveyor portions 202, 204 during transport toward the exit end 210 of the conveyor 200. In one embodiment, each ridge or detent 228 can be spaced along the length of the moving conveyor portions 202, 204 so that adjacent pairs of the detents define a series of pockets 232 therebetween which may have generally equal depths. Of course, other configurations of the ridges or detents 228 and the pockets 232 are possible as well.

Referring now to FIGS. 9, 10 and 11A-11D, a conveyor 300 is shown according to another alternative embodiment of the present invention, where like numerals represent like parts to the self-cleaning pet litter box assembly 10 of FIGS. 1-5 and 6A-6D. In this embodiment, the conveyor 300 has a stationary conveyor portion 302 comprising a series of generally parallel members 304, such as grates or other suitable structure, which define an inclined surface 306 for supporting the clumped litter or solid pet waste 80 as it is conveyed toward the waste receptacle 22.

Figure 9:
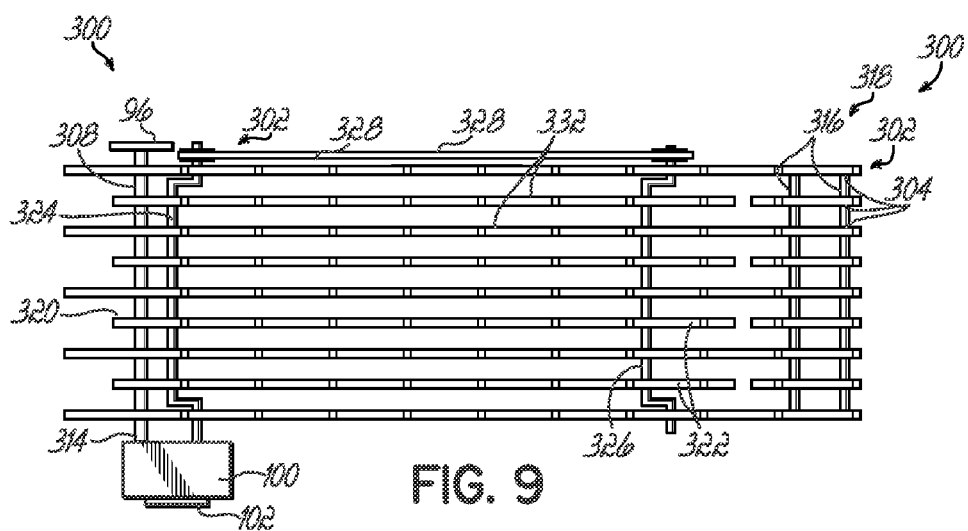
FIG. 9 is a top plan view of a conveyor according to a third embodiment of the present invention.
Figure 10:
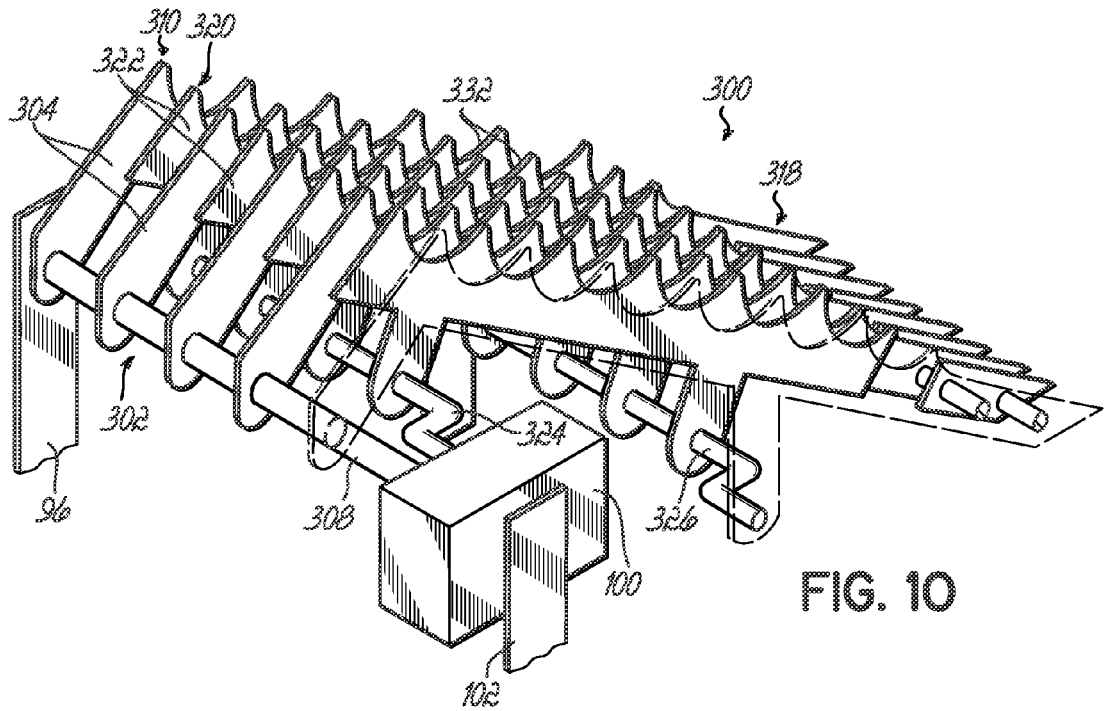
FIG. 10 is a perspective view of the conveyor shown in FIG. 9.

As shown in FIGS. 9 and 10, a transverse connecting member 308 is connected to each of the stationary members 304 adjacent an exit end 310 of the conveyor 300. One end 312 of the connecting member 308 is supported by the upstanding bracket 96 positioned on one side of the waste receptacle 22. The opposite end 314 of the connecting member 308 is supported by the housing of the motor 100 used to drive the conveyor 300. A pair of transverse connecting members 316 are connected to each of the stationary members 304 adjacent a lower end 318 of the conveyor 300.

The conveyor 300 further includes a moving conveyor portion 320 comprising a series of generally parallel members 322, such as grates or other suitable structure, which are positioned between the stationary members 304.

A transverse crank shaft 324 is connected to each of the moving members 322 adjacent the exit end 310 of the conveyor 300. The moving conveyor portion 320 is connected to the motor 100 adjacent the exit end 310 of the conveyor 300 through the crank shaft 324. The motor 100 imparts rotation to the crank shaft 324. A transverse crank shaft 326 is connected to each of the moving members 322 adjacent the lower end 318 of the conveyor 300 and its opposite ends are supported by the outmost stationary members 304. The crank shaft 326 is connected to the crank shaft 324 through a belt, chain or other suitable linkage device 328 so that rotational movement of the crank shaft 324 imparts rotational movement to the crank shaft 326.

As shown in FIGS. 11A-11D, the motor 100 rotates the crank shaft 324 which imparts rotational movement to the crank shaft 326. Rotation of the crank shafts 324 and 326 causes the moving members 322 to rise up through the slits, grooves or gaps between the stationary members 304, lift clumps of soiled litter and solid pet waste 80 supported on the inclined surface 306 of the stationary conveyor portion 302, and carry them incrementally up the inclined surface 306.

Figure 11A:
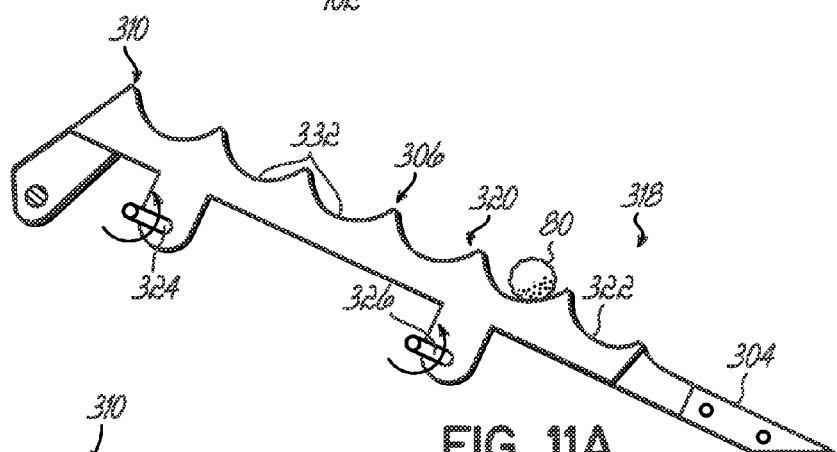
FIGS. 11A-11D are diagrammatic side elevational views showing operation of the conveyor of FIG. 9.
Figure 11B:
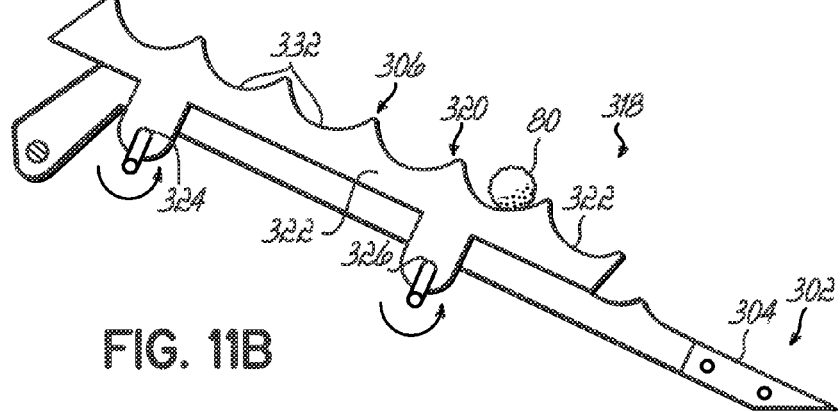
Figure 11C:
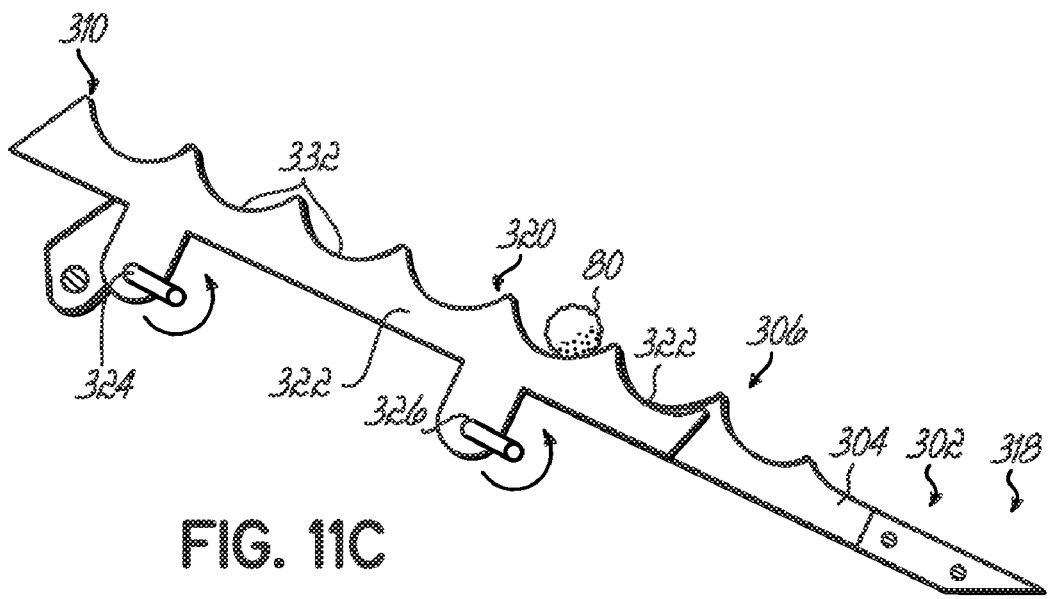
Figure 11D:
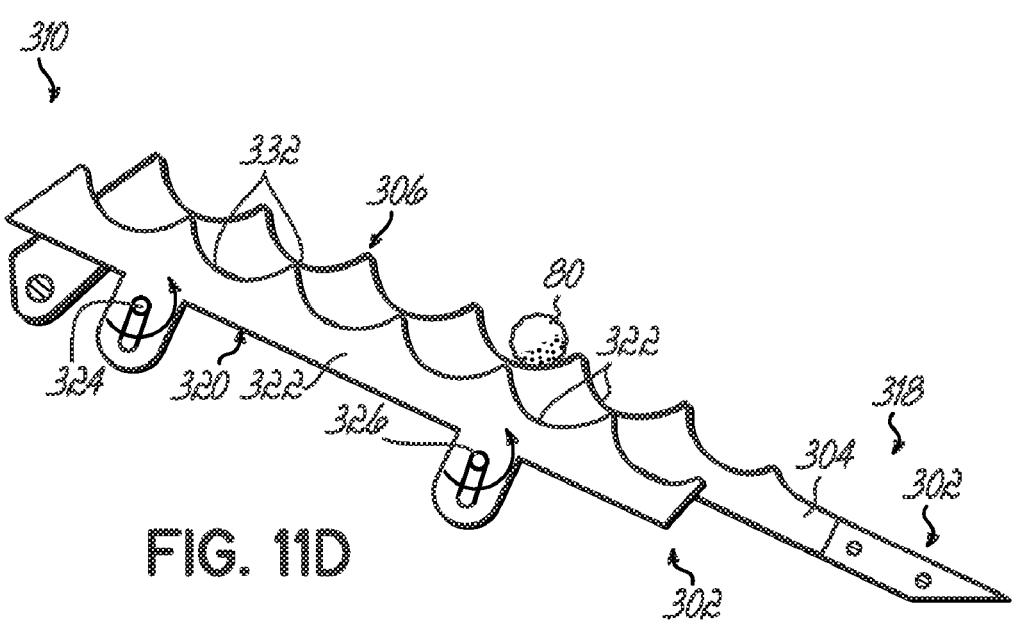

Once the clumps of soiled pet litter and solid pet waste 80 have been moved one increment up the inclined surface 306 as shown in FIGS. 11A-11C, the moving conveyor portion 320 lowers through the slits, grooves or gaps between the stationary members 304 as shown in FIG. 11D, where it returns to its original position, ready to incrementally lift a new clump of litter or solid pet waste, and/or incrementally lift the previous material further up the inclined surface 306.

In one embodiment, the stationary and moving conveyor portions 302, 320 have a series of ridges, detents or other suitable structure 330 configured to help prevent the clumped litter and solid pet waste from falling down the inclined surfaces 306 of the stationary conveyor portion 302 during transport toward the exit end 310 of the conveyor 300. In one embodiment, each ridge or detent 330 is spaced along the lengths of the stationary and moving conveyor portions 302, 320 so that adjacent pairs of the detents 330 define a series of pockets 332 therebetween which may have generally equal depths as shown in FIGS. 9, 10 and 11A-11D.

In use, the open-top pet litter container 14 of the self-cleaning pet litter box assembly 10 has litter added to a normal depth and the assembly is placed in the home at a normal out-of-the-way location. Preferably, the litter material is of the clumping-type which is commercially available. The motor 16 is energized by plugging it into a wall outlet or through activation of a switch. In due course, the pet uses the pet litter box assembly 10. The pet is likely unaware of any rotating motion. The pet leaves the litter container 14 when finished. The litter container 14 continues to rotate or begins to rotate based on a timer or in response to the motion sensor (not shown) depending on the motion embodiment selected. While the pet litter container 14 rotates, the conveyor 20, 200, 300 is driven by the motor 100. Eventually, the clumped litter material and solid pet waste is advanced through rotation of the litter container 14 toward the conveyor 20, 200, 300 which separates out the clumped litter material and solid pet waste from the clean litter and incrementally transports it away to the waste receptacle 22. After a time which the pet owner has learned to be normal, e.g., seven to ten days, the waste receptacle 22 is near full and needs to be emptied or replaced.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of Applicant's general inventive concept.

Having described the invention, what is claimed is:

1. A self-cleaning pet litter box assembly configured to separate and remove clumped litter and solid pet waste from clean litter material, comprising:

a base;

an open-top pet litter container configured to hold litter therein and being mounted for substantially horizontal rotation relative to said base;

a conveyor having one end configured to extend into the pet litter container and an opposite exit end, said conveyor comprising a first moving conveyor portion defined by a first plurality of horizontally spaced members and a second moving conveyor portion defined by a second plurality of horizontally spaced members, said first and second conveyor portions moving with reciprocating movement in an out-of-phase relationship and cooperating with each other to incrementally transport clumped litter and solid pet waste away from the litter within the pet litter container in a single direction toward the exit end thereof;

a first transverse crankshaft operatively coupled to the first moving conveyor portion and the second moving conveyor portion proximate the exit end; and a second transverse crankshaft operatively coupled to the first moving conveyor portion and the second moving conveyor portion proximate the one end;

each of the first and second transverse crankshafts having a fixed axis of rotation, and each of the first and second transverse crankshafts operating so as to rotate in only a single direction to incrementally transport the clumped litter and solid pet waste toward the exit end of the conveyor.

2. The self-cleaning pet litter box assembly of claim 1 wherein each of said first and second moving conveyor portions has a plurality of detents disposed along at least a partial length thereof.

3. The self-cleaning pet litter box assembly of claim 1 further comprising a waste receptacle positioned adjacent the exit end of said conveyor to receive the clumped litter and solid pet waste incrementally transported toward the exit end by said conveyor.

4. The self-cleaning pet litter box assembly of claim 1 further comprising a separating member positioned to contact the litter within the pet litter container and being configured to separate clumped litter and solid pet waste from the litter within the pet litter container and direct the clumped litter and solid pet waste toward said conveyor.

5. The self-cleaning pet litter box assembly of claim 4 wherein said separating member includes a plurality of openings configured to retain the clumped litter and solid pet waste and permit unclumped material to pass through said openings.

6. The self-cleaning pet litter box assembly of claim 1 further comprising a drive mechanism operatively connected to said pet litter container to rotate said container.

7. The self-cleaning pet litter box assembly of claim 1 further comprising a drive mechanism operatively connected to said conveyor to drive said conveyor.

8. The self-cleaning pet litter box assembly of claim 1 further comprising a cover configured to fit over said open-top pet litter container and having an opening to expose litter contained within said container and provide access to the litter for use by the pet.

9. A self-cleaning pet litter box assembly configured to separate and remove clumped litter and solid pet waste from clean litter material, comprising:
   a base;
   an open-top pet litter container configured to hold litter therein and being mounted for substantially horizontal rotation relative to said base;
   a drive mechanism operatively connected to said pet litter container to rotate said container;
   a conveyor having one end configured to extend into the pet litter container and an opposite exit end, said conveyor comprising a first moving conveyor portion defined by a first plurality of horizontally spaced members and a second moving conveyor portion defined by a second plurality of horizontally spaced members, said first and second conveyor portions moving with reciprocating movement in an out-of-phase relationship and cooperating with each other to incrementally transport clumped litter and solid pet waste away from the litter within the pet litter container in a single direction toward the exit end thereof;
   a first transverse crankshaft operatively coupled to the first moving conveyor portion and the second moving conveyor portion proximate the exit end; and
   a second transverse crankshaft operatively coupled to the first moving conveyor portion and the second moving conveyor portion proximate the one end;
   each of the first and second transverse crankshafts having a fixed axis of rotation, and each of the first and second transverse crankshafts operating so as to rotate in only a single direction to incrementally transport the clumped litter and solid pet waste toward the exit end of the conveyor;
   a separating member positioned to contact the litter within the pet litter container and being configured to separate clumped litter and solid pet waste from the litter within the pet litter container and direct the clumped litter and solid pet waste toward said conveyor; and
   a waste receptacle positioned adjacent the exit end of said conveyor to receive the clumped litter and solid pet waste incrementally transported by said conveyor.

10. The self-cleaning pet litter box assembly of claim 9 wherein each of said first and second moving conveyor portions has a plurality of detents disposed along at least a partial length thereof.

11. The self-cleaning pet litter box assembly of claim 9 wherein said separating member includes a plurality of openings configured to retain the clumped litter and solid pet waste and permit unclumped material to pass through said openings.

12. The self-cleaning pet litter box assembly of claim 9 further comprising a drive mechanism operatively connected to said conveyor to drive said conveyor.

13. The self-cleaning pet litter box assembly of claim 9 further comprising a cover configured to fit over said open-top pet litter container and having an opening to expose litter contained within said container and provide access to the litter for use by the pet.

14. A method of removing clumped material and solid pet waste from clean litter material in a pet litter box, the method comprising:
   obtaining a pet litter box assembly having a horizontally rotating pet litter container and a conveyor having one end configured to extend into the pet litter container and an opposite exit end, the conveyor comprising a first moving conveyor portion defined by a first plurality of horizontally spaced members and a second moving conveyor portion defined by a second plurality of horizontally spaced members, said first and second conveyor portions moving with reciprocating movement and cooperating with each other, a first transverse crankshaft operatively coupled to the first moving conveyor portion and the second moving conveyor portion proximate the exit end, and a second transverse crankshaft operatively coupled to the first moving conveyor portion and the second moving conveyor portion proximate the one end, each of the first and second transverse crankshafts having a fixed axis of rotation, and each of the first and second transverse crankshafts operating so as to rotate in only a single direction to incrementally transport the clumped litter and solid pet waste toward the exit end of the conveyor, the method further comprising the steps of:
   rotating the pet litter container to advance the clumped material and solid pet waste toward the conveyor; and
   moving the first and second moving conveyor portions by reciprocating movement in an out-of-phase relationship to incrementally transport the clumped litter and solid pet waste away from the litter within the pet litter container in a single direction toward the exit end thereof.

15. The method of claim 14 further comprising the steps of:
   positioning a waste receptacle proximate the exit end of the conveyor; and
   receiving the separated-out clumped litter and solid pet waste in the waste receptacle.

16. The method of claim 14 wherein the pet litter box assembly further has a separating member positioned to contact the litter within the pet litter container, the method further comprising the steps of:

separating the clumped material and solid pet waste from the clean litter material by passing the clean litter material through the separating member; and directing the clumped material and solid pet waste toward the conveyor with the separating member.

17. The method of claim 14 wherein each of the first and second moving conveyor portions has a plurality of detents disposed along at least a partial length thereof.

\* \* \* \* \*